Feb. 17, 1942.  G. W. SCHATZMAN  2,273,539
ADJUSTABLE FENDER SHIELD
Filed Sept. 1, 1939   5 Sheets-Sheet 2

Inventor
GEORGE W. SCHATZMAN

Feb. 17, 1942.  G. W. SCHATZMAN  2,273,539
ADJUSTABLE FENDER SHIELD
Filed Sept. 1, 1939  5 Sheets-Sheet 3

INVENTOR
GEORGE W. SCHATZMAN

Patented Feb. 17, 1942

2,273,539

UNITED STATES PATENT OFFICE 2,273,539

ADJUSTABLE FENDER SHIELD

George W. Schatzman, Detroit, Mich., assignor to Houdaille-Hershey Corporation, Detroit, Mich., a corporation of Michigan Application September 1, 1939, Serial No. 293,013

14 Claims. (Cl. 280—153)

This invention relates to means for covering or closing the wheel access opening in the fender of a vehicle or in other types of wheel enclosures. In particular, my invention relates to "fender shields" or "fender skirts" as such devices are known when used in connection with a fender, but this invention is equally applicable to automotive vehicles having a body wide enough to enclose the wheel without the use of fenders, and in which the wheel access openings are in the sides of the body itself. Bodies having such a width are to be found today only among commercial vehicles, but I wish it to be expressly understood that this invention is equally applicable to such bodies on commercial vehicles and also on private vehicles, if at sometime in the future such bodies should come into use on private vehicles. Therefore, while I have referred to my invention as a fender shield, it is to be clearly understood that this term includes covers for wheel access openings in the side of a body or other wheel enclosing member as well as for wheel access openings in fenders.

In the manufacture of fender shields, at the present time, when they are largely used only as optional equipment and a comparatively small number is manufactured for use on any particular make of automobile, it is extremely desirable to be able to employ the same fender shield or, at least, the same fender shield panel on different makes or lines of automobiles and thus effect a substantial saving in the cost of dies and other elements of the manufacturing cost.

The problem of making one fender shield panel fit on a number of different fenders has been partially solved by designing the fender shield panel to fit against the approximately vertical side of the fender instead of within the wheel access opening so that the fit of the fender shield panel is independent of the exact shape of the wheel access opening. Another part of the above problem has been solved by providing adjustable or replaceable hooks at the bottom of the fender shield for engaging the inturned edge of the fender ahead of and behind the wheel access opening, the adjustability or replaceability of these hooks or supports allowing the fender shield to be used on different fenders, as is fully explained in my copending application entitled "Fender shield and mounting means therefor," Serial No. 271,915.

Satisfactory fitting of the same fender shield against the side of fenders which vary slightly in curvature may be accomplished by making the fender shield panel itself flexible enough so that it can be held in tightly against the sides of fenders of slightly different shapes by means of its fastening means.

One of the principal objects of the present invention is to provide a fender shield which will not only fit fenders having different wheel access openings and slightly different curvatures of the side but which will also fit fenders having different wheel access openings and considerable differences in the curvature of their sides and will therefore be able to fit a much greater range of different fenders than any fender shield hitherto devised.

Another object of the present invention is to provide a fender shield of the type which is adapted to fit against the side of a fender rather than in the wheel access opening and whose curvature can be varied independently of the means for holding it onto the fender so that it can be made to fit fenders having substantially different curvatures of the sides.

A further object of the present invention is to provide a fender shield of the type adapted to fit against the side of a fender rather than in the wheel access opening and whose curvature can be readily adjusted either before or after the fender shield is mounted upon the fender.

A still further object of the present invention is to provide a fender shield having an unusually large inherent resiliency to enable it to fit against the sides of fenders which vary considerably in curvature.

The principal feature of the present invention which enables it to attain the above and other objects is the provision of means carried by the fender shield panel for applying forces to the panel in such a manner as to change its curvature from what it would be without the application of those forces. More specifically, the invention consists in providing a fender shield panel which bellies out slightly from top to bottom and which has means on the back for forcing the top and bottom apart and thereby changing the curvature of not only the central portion of the sheet panel but also of the edge which fits against the side of the fender.

In certain forms of the invention, the means for forcing apart the upper and lower edges of the fender shield panel may include a positive screw adjustment, and in other forms this means may include springs and be self-adjusting.

Another feature of the present invention is the use of the means for adjusting the curvature of the fender shield panel as a support for the latch which holds the fender shield in place against the side of the fender.

These and other novel features which I believe to be characteristic of my invention are set forth with particularity in the appended claims. My invention itself, however, both as to its organization and manner of construction, together with further objects and advantages thereof, may best be understood by reference to the following description, taken in connection with the accompanying drawings, in which:

This application is a continuation-in-part of my copending application entitled "Fender Shield and Mounting Means Therefor," Serial No. 271,915, filed May 5, 1939, and, as far as the first form of the invention described below is concerned, is a true division of that application.

The embodiment of the invention shown in Figures 1 to 5 of the drawings is designed to be mounted upon a conventional "streamlined" automobile fender 21 having an approximately semi-circular wheel access opening 22. The edge of the fender 21 along the bottom and around the wheel access opening 22 is bent in so as to form an inwardly projecting flange 23, 24, 25 in front of, around and in back of the wheel access opening 22.

Figure 1:
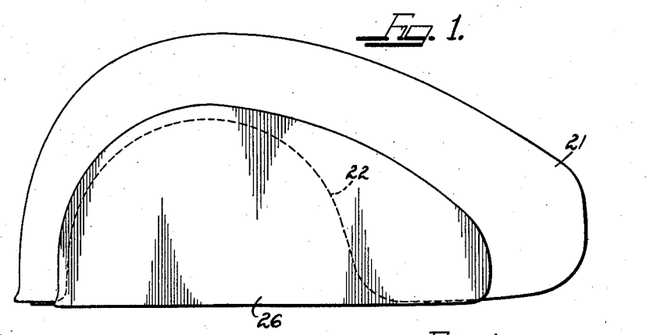
Figure 1 is a side elevation of one of the preferred embodiments of my invention as it appears when mounted on a fender.
Figures 2, 5:
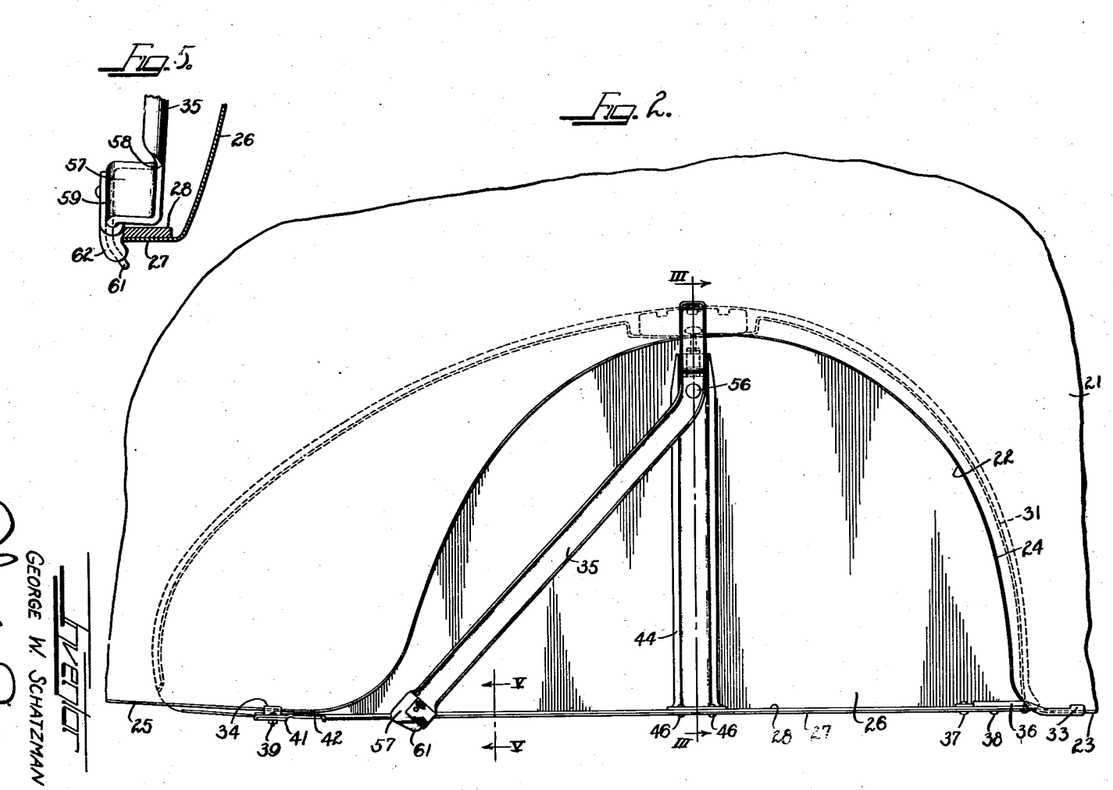
Figure 2 (on the second sheet of drawings) is a side elevation of the form of the invention shown in Figure 1 as seen from the inside of the fender.
Figure 5 is a section taken on the line V—V of Figure 2 and looking in the direction of the arrows.
Figures 3, 4, 10:
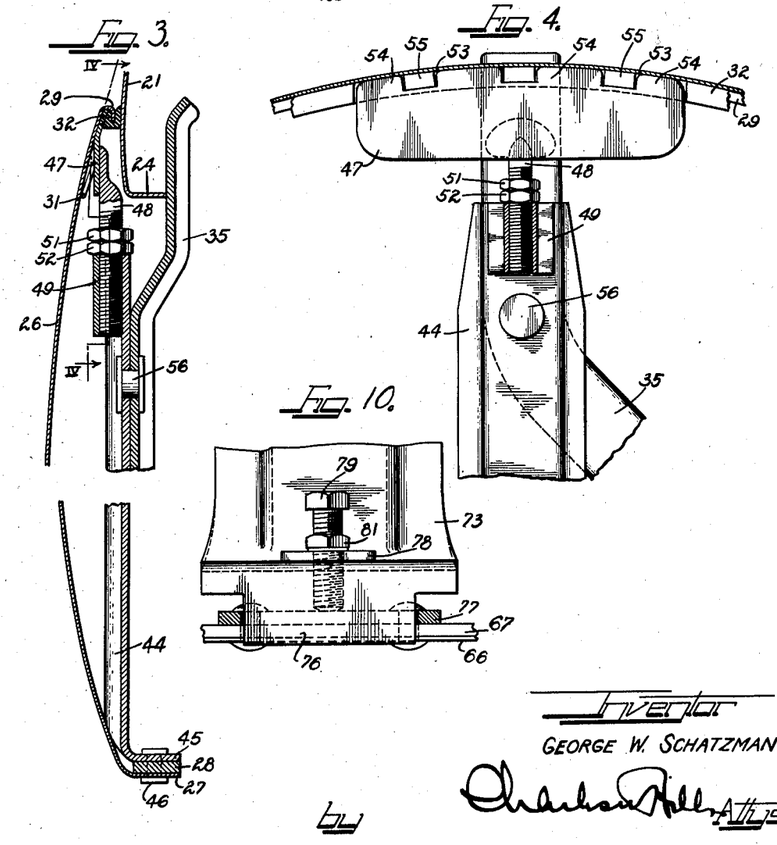
Figure 3 is a vertical cross-sectional view taken on the line III—III of Figure 2 and looking in the direction of the arrows.
Figure 4 is a view, partly in section of the upper portion of the latch and adjusting mechanism and its attachment to the fender shield panel, the view being taken from the line IV—IV in Figure 3 and looking in the direction of the arrows.
Figure 10 (on the same sheet as Figure 1) is an elevational view, partly in section, taken on the line X—X of Figure 8 and looking in the direction of the arrows.

The fender shield comprises a sheet panel 26 which is large enough to cover the entire wheel access opening 22 as shown in Figures 1 and 2. The lower edge of the panel 26 is approximately straight and is bent back to form a horizontal flange 27, to the upper side of which is secured a reinforcing bar 28. At the ends and around the top, the edge of the panel 26, which lies against the side of the fender 21, is folded back, as shown in Figure 3, to form a thin U-shaped reinforcement 29. The reinforcement 29 not only serves to strengthen the edge of the panel 26 but also serves, in connection with a stiff wire 31, to secure a rubber edging 32 which prevents metal to metal contact between the edge of the metal panel and the side of the fender. The manner in which the rubber edging 32 is held in place forms no part of the present invention and is fully described and illustrated in my copending patent application entitled "Fender shield," Serial No. 269,651, filed April 24, 1939.

The bottom of the fender shield is provided with two hooks 33 and 34, by means of which the fender shield is connected to the inturned flange 23, 25 in front of and behind the wheel access opening 22. The hooks 33 and 34 fit against the edge of and rest on top of the two portions 23 and 25 of the fender flange and form pivots defining an axis about which the fender shield panel may be rocked into a position against the side of the fender. In mounting the fender shield, the fender shield is first held at an angle with its lower edge under the edge of the fender, and the hooks 33 and 34 are hooked up onto the fender flange 23, 25. The fender shield is then swung up into a vertical position against the side of the fender 21, and its top is secured by the latch 35 described in detail below.

The fender shield panel 26 may be shaped so that it will fit against the side of the fender 21 without being strained, but it has been found that a much tighter and better fit can be secured if the fender shield panel 26 is formed so that, before it is mounted upon the fender, it has a different curvature than the side of the fender and must be strained or flexed into position. The fender shield panel is shaped so that when the hooks 33 and 34 are hooked onto the fender flange 23, 25 and the fender shield panel is swung up toward its attached position, the edge of the panel at each end will lie closely against the side of the fender 21 near the bottom and will gradually diverge upwardly, the greatest divergence between the edge of the fender shield panel 26 and the side of the fender 21 being at the top directly opposite the latch 35. With the fender shield panel 26 shaped in this manner, the entire edge of the panel will be pressed into tight contact with the side of the fender when the top of the fender shield is pressed against the side of the fender and held there by the latch 35. When this is done, the entire panel 26 is sprung or strained slightly, and its own resiliency holds its edge in tight contact with the side of the fender.

The front and rear hooks 33 and 34 which support the fender shield panel 26 upon the fender 21 and which hold its lower portion in tightly against the side of the fender are adjustable in order that the fender shield may be readily fitted to different fenders. The front hook 33 is carried at the forward end of an arm 36 which is pivoted to the reinforcing bar 28 and flange 27 at the bottom of the fender shield panel by a rivet 37. The arm 36 can be held in various positions by means of a bolt 38 which can be placed in different sets of holes in the arm 36 and the flange 27 and reinforcing bar 28.

The rear hook 34 is secured by a bolt 39 to a bracket 41 riveted to the bottom flange 27 and reinforcing bar 28 of the panel. The hole in the bracket 41 for the bolt 39 is made elongated and a plurality of holes for the bolt 39 are provided in the base 42 of the rear hook 34 in order to enable the rear hook 34 to be mounted in different positions. The specific details of these constructions form no part of the present invention and are fully described and claimed in my copending application entitled "Fender shield and mounting means therefor" Serial No. 271,915, filed May 5, 1939.

The curvature of the fender shield panel 26 may be adjusted in order to make it fit different fenders by means of a stay or strut mechanism extending between the top and bottom edges on the back of the panel. This mechanism comprises a stay or strut 44 which is channel shaped in cross section and whose lower end is flattened and bent out horizontally to form a foot 45 which rests on top of the reinforcing bar 28 and which is secured to it and to the flange 27 on the bottom of the panel 26 by means of a pair of rivets 46. The upper end of the stay 44 is provided with a generally flat shoe 47 which fits in under the flange 29 on the edge of the fender shield panel 26 and holds the upper end of the stay 44 in place. The shoe 47 is connected to the stay 44 by means of a stud 48 spot-welded to the shoe 47 and extending down into a tube formed by a small stamping 49 spot-welded to the face of the stay 44 at its upper end. The stud 47 is threaded, but the tube 49 into which it fits is not threaded, thereby leaving the stud 48 free to slide vertically with respect to the stay 44 and tube 49. Positioning of the shoe 47 and stud 48 with respect to the stay 44 and tube 49 is accomplished by means of a pair of nuts 51 and 52 threaded onto the stud 48 above the end of the stay 44. The lower nut 52 bears against the top of the stay 44 and tube 49 and forces the shoe 47 and stud 48 upward so that the shoe 47 is held in tight engagement with the edge of the fender shield panel 26. The upper nut 51 serves as a lock nut.

By changing the adjustment of the nuts 51 and 52, the upper edge of the fender shield panel can be forced up away from the lower edge more or less. As the top and bottom edges of the panel 26 are forced apart in this way, the panel will be flattened from top to bottom, and the decrease in curvature in this direction will be accompanied by an increase in curvature from side to side. Thus the curvature of the panel and, more particularly, the curvature of the edge of the panel which fits against the side of the fender can be adjusted to accommodate the fender shield to different fenders having sides of different curvatures.

The shoe or plate 47 forming the upper end of the stay or strut mechanism serves also to support a portion of the rubber edging 32 which is not held in place by the edging support wire 31. For this purpose, the upper edge of the plate 47 is provided with a plurality of rectangular notches 53 which divide the upper edge of the plate 47 into a plurality of upwardly projecting fingers 54. One side of the rubber edging 32 is cut away to provide room for the fingers 54, lugs 55 being left between the cut away places and fitting into the notches 53. The lugs 55 are thus engaged from underneath by the shoe or plate 47 and hold the rubber edging 32 up in place.

The stay or strut 44, besides serving as a portion of the means for adjusting the curvature of the fender shield panel 26, also serves as a support for the latch 35. The latch 35 is in the form of a dog legged lever which is pivoted by a rivet 56 to the back of the stay or strut 44, and is shaped so that when its upper portion is vertical, its lower portion extends down at an angle to the lower edge of the fender shield, as shown in Figure 2. The main portion of the latch lever 35 is channel shaped in cross section in order to increase its strength and stiffness, but the lower end 57 is flat in cross section and is formed with a pair of reverse bends 58 and 59 so that the portion between the bends may rest on top of the reinforcing bar 28. One corner 61 of the end of the latch lever beyond the two bends 58 and 59 is bent so that it projects under the reinforcing bar 28 and the flange 27 on the bottom of the panel 26. Thus the end of the latch lever 35 fits around under and over the bottom flange 27 on the panel and the reinforcing bar 28 and holds the latch lever 35 from being swung in either direction. A piece of thick fabric 62 is wrapped around and riveted to the end of the lever where it rests against the edge of the reinforcing bar 28 to prevent rattling or squeaking.

The latch lever 35 itself has a certain amount of flexibility which contributes to making it easy for its end to be sprung back far enough to allow the lever to be swung down behind the bottom flange 27 in the reinforcing bar 28 when it is desired to swing the upper end of the latch to an inoperative position, but this operation is also facilitated by the torsional resiliency of the stay or strut 44. Since the upper end of the stay 44 is free to rotate on the stud 48 and since the length of the stay from the pivot 56 of the latch lever 35 to the bottom of the stay where it is secured by the rivets 46 is considerable, the upper end of the stay 44 carrying the latch lever 35 can twist to some extent about a vertical axis, the twisting, of course, being resisted only by the torsional stiffness of the stay. The stay 44 is in the form of a channel rather than having a closed section, and its torsional stiffness is not great. It is therefore relatively easy to spring the end of the latch lever 35 out of engagement with the flange 27 and reinforcing bar 28 along the lower edge of the panel. The lower end of the latch lever 35 can then be swung forward, whereupon the upper end will swing back and down and release the upper portion of the fender shield from the fender.

A second embodiment of the invention is illustrated in Figures 6 to 10. This form of the invention comprises a panel 65 reinforced at the bottom by a horizontal flange 66 and reinforcing bar 67 and having an inturned edge 68 forming a U-shaped reinforcement along the top and rear edges, as in the first form of the invention. The panel is also provided with a rubber edging 69 held in place by a supporting wire 71 and with front and rear hooks at the bottom exactly as in the first form of the invention. This form of the invention differs from the first form, illustrated in Figures 1 to 5, only in the stay and latch mechanisms and in the provision of an opening through the panel for the operation of the latch.

In this form of the invention, the stay 73 is flattened at the upper end and is spot-welded directly to the shoe or plate 74 which presses up inside of the U-shaped upper edge 68 of the panel 65, and the adjustment for the stay is provided at the bottom. At the bottom, the stay 73 is flattened and bent horizontally to form a base 75 parallel to and directly above the reinforcing bar 67, and is then bent again to form a tail or guide 76 extending down alongside the edge of the reinforcing bar 67. The tail 76 on the stay 73 fits slidably in a slot in a guide plate 77 riveted on top of the reinforcing bar 67 and prevents any lateral movement of the stay 73. The base or foot 75 of the stay is reinforced by a small plate 78 welded on top of it to provide sufficient thickness for a threaded hole to receive an adjusting stud 79. The stud 79 bears against the top of the guide plate 77 which is on top of the reinforcing bar 67 and enables the stay 73 to be forced up with respect to the reinforcing bar 67 and the bottom flange 66 of the fender shield panel 65. Thus the curvature of the fender shield panel 65 can be adjusted in exactly the same way as in the first form of the invention, and a lock nut 81 is provided on the stud 79 for retaining the adjustment.

The upper end of the stud 73 carries a latch 83 which is pivoted to it by means of a rivet 84. The rivet 84 has a large hexagonal head 85 on the end next to the panel 65 and a shank having a round portion 86 journaled in the stay 73 and a smaller square portion 87 fitting into a square hole in the latch 83. The difference in size between the square portion 87 and the round portion 86 of the shank of the rivet 84 provides a shoulder against which the latch 83 is firmly held by the head of the rivet while allowing the rivet 84 and latch 83 to turn freely with respect to the stay 73.

In order to prevent accidental movement of the latch 83, a flat leaf spring 88 is secured to it by the rivet 84 and has a bluntly pointed end 89 which projects resiliently into a hole 91 in the stay 73. The spring 89 is sufficiently stiff to hold the latch 83 in its upright or operative position when the fender shield is in use and at the same time is sufficiently flexible to enable the latch 83 to be swung around to its inoperative position when it is desired to remove the fender shield.

Figures 6, 7, 8, 9:
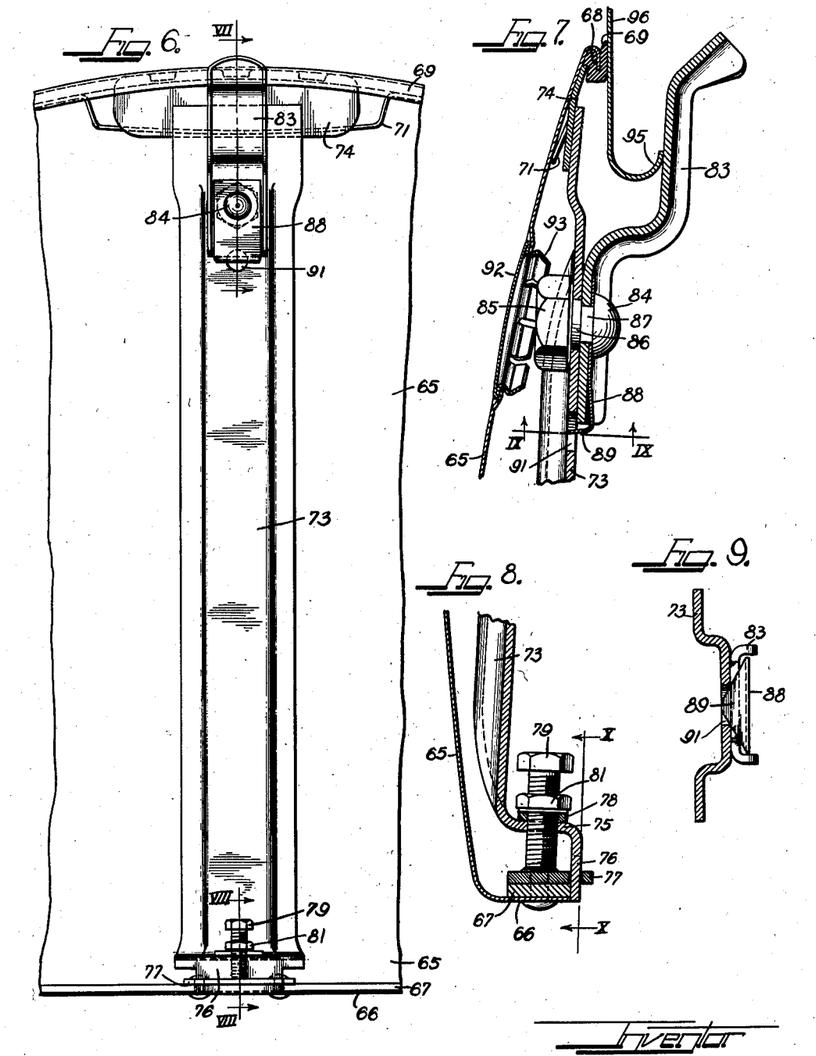
Figure 6 is an elevation of the back of the central portion of a fender shield embodying a second embodiment of the invention.
Figure 7 is a cross-sectional view taken on the line VII—VII of Figure 6 and looking in the direction of the arrows.
Figure 8 is a cross-sectional view taken on the line VIII—VIII of Figure 6 and looking in the direction of the arrows.
Figure 9 is a horizontal section taken on the line IX—IX of Figure 7 and looking up in the direction of the arrows.

The fender shield panel 65 is provided with an aperture for allowing access to the hexagonal head 85 of the latch pivot 84. This aperture is closed by a cap 92 which fits over the aperture and is provided with a plurality of spring fingers 93 adapted to engage the sides of the hole and hold the head 92 in place. The cap or closure 92 may be readily pried off by means of a suitable tool, such as a screwdriver, whereupon a wrench, such as the wrench employed for removing the bolts or nuts which secure a wheel to its hub, may be inserted through the aperture and engaged with the hexagonal head 85 of the latch pivot 84. The latch 83 may thereupon be swung down to an inoperative position or may be swung up behind the inturned edge 95 of the fender 96 for holding the fender shield in position, as shown in Figure 7.

Figures 11, 13:
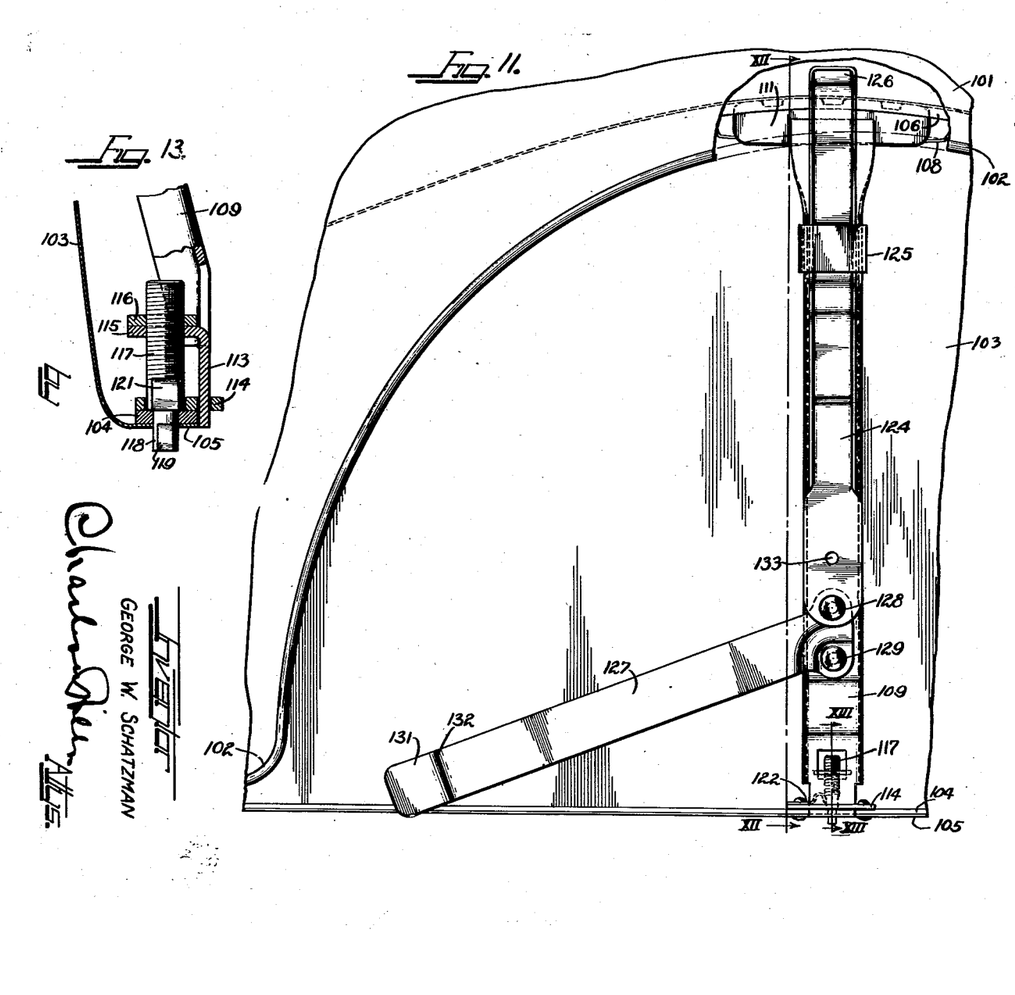
Figure 11 is an elevational view of the back or inside of a fender shield mounted on a fender and embodying a third form of the invention, a large part of the fender and fender shield being broken away to conserve space on the drawings.
Figure 13 is a cross section on the line XIII—XIII of Figure 11 looking in the direction of the arrows.
Figure 12:
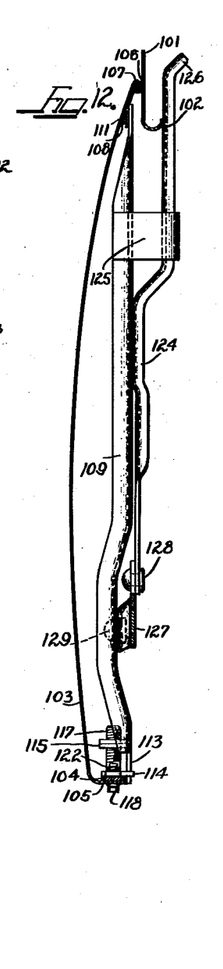
Figure 12 is a cross section on the line XII—XII of Figure 11, looking in the direction of the arrows.

A third embodiment of the invention is illustrated in Figures 11 to 13. This particular form of the invention is shown applied to a fender 101 similar to the fender 21 shown in Figure 1 and differing therefrom only in that its edge 102 is curled to form a U-shaped reinforcement rather than a flange.

The fender shield comprises a panel 103 which is identical with the panel 26 of the form of the invention shown in Figures 1 to 5 and which is provided with a similar reinforcing bar 104 secured to its bottom flange 105 and a similar rubber edging 106 held in the same way by the infolded edge 107 of the panel and the supporting wire 108. Suitable hooks, similar to those employed on the first embodiment of the invention, are provided at each end of the reinforcing bar 104 for supporting the fender shield upon the inturned edge 102 of the fender and for holding the bottom of the fender shield panel tightly against the side of the fender.

The only substantial difference between this embodiment of the invention and the first embodiment described above is in the construction of the stay and latch mechanisms. In this embodiment, the stay 109 is channel shaped in cross section throughout the greater part of its length and has its upper end flattened and spot-welded to a shoe or plate 111 which fits up in under the infolded edge at the top of the fender shield panel 103. The plate 111 is formed with notches for cooperating with the rubber edging 106 in the same way as in the first embodiment of the invention.

The lower end of the stay 109 is formed into a flat tongue 113 which extends down behind the reinforcing bar 104, passing through an opening in a guide plate 114 riveted on top of and projecting behind the reinforcing bar 104. A short distance above the guide plate 114, a lug 115 is struck out of the stay 109 and is bent in horizontally. The lug 115 is reinforced by a flat piece of metal 116 welded to its surface in order to provide a double thickness of metal for a threaded hole. The threaded hole receives an adjusting screw 117 which extends down through a hole in the guide plate 114 and has a shoulder which bears against the top of the reinforcing bar 104 at the bottom of the fender shield panel. The lower end of the adjusting screw 117 is formed into a stem 118 which projects down through the reinforcing bar 104 and the panel flange 105 and is provided with a pair of flats 119 adapted to receive a wrench for turning the screw 117.

The body of the adjusting screw 117 is provided with a pair of flats 121 against which the end of a leaf spring 122 is adapted to bear in order to prevent accidental rotation of the adjusting screw. This arrangement allows the adjusting screw 117 to be readily turned when the fender shield is in position on the fender and makes it very easy to adjust the fender shield to the particular fender upon which it is mounted so as to have a tight even contact between the entire edge of the fender shield and the side of the fender.

The latch mechanism employed in this form of the invention comprises an elongated latch or bolt 124 which is vertically slidable on the back of the stay 109 and is guided near its upper end by a stirrup 125 through which it extends and which is spot-welded to the stay 109. The upper end 126 of the latch 124 is bent back obliquely, as shown in Figure 12, and forms a cam surface adapted to engage the inturned edge 102 of the fender as the latch 124 is being forced up into place for drawing the top of the fender shield tightly against the side of the fender 101.

The lower end of the bolt 124 is connected to an operating lever 127 by a rivet 128 which acts as a pivot, the operating lever 127 being pivoted in its turn by a rivet 129 to the back of the stay 109. The two pivots 128 and 129 are only a short distance apart and are located so that they are in the same vertical plane when the lever 127 is in the position shown in Figure 11, with its end 131 swung up behind the panel 103 and supported by the reinforcing bar 104. To enable the lever 107 to be readily placed in this position, the main part of the lever is flat and somewhat flexible so that its end can be readily sprung out from above and swung down behind the reinforcing bar 104. Also, the outer end of the lever 127 is formed with two transverse bends to provide a short portion 132 perpendicular to the rest of the lever and adapted to rest on top of the reinforcing bar 104 while the extreme end portion 131 of the lever depends down behind the reinforcing bar 104 so that it may be more readily accessible.

To operate the latch 124, the lever 127 is sprung out from above the reinforcing bar 104 and is swung down and around and up on the other side of the strut 109, thereby swinging the pivot 128 around the fulcrum 129 and pulling the latch or bolt 124 downwardly a distance approximately equal to twice the distance between the pivot 128 and fulcrum 129 of the latch lever 127. The lateral movement of the pivot 128 as it swings around the fulcrum 129 will swing the lower end of the latch or bolt 125 laterally, but this movement is small compared to the distance between the pivot 128 and the latch guide 125 and is readily accommodated by the clearance provided at the side of the latch 124 in the latch guide 125.

In order to allow this form of the invention to be used upon fenders having wheel access openings of materially different size, the latch or bolt 124 is provided with one or more extra holes 133 near its lower end through which the pivot 128 may be fastened when the fender shield is assembled.

Three additional forms of the invention are shown in Figures 14 to 19, each of these forms differing from the forms shown in Figures 1 to 13 and described above chiefly in that the vertical stay is provided with resilient means, such as springs, for pressing it upward instead of having a positive screw adjustment. These forms of fender shields can adjust themselves to greater differences in the shape of the side of the fender than can fender shields having no means at all for applying oppositely directed forces to their upper and lower edges and they are simpler to install than fender shields having a positive adjusting means, in that they are self-adjusting.

Each of the three forms of fender shields shown in Figures 14 to 19 comprises a panel 136 having a horizontal flange 137 along its lower edge reinforced by a bar 138. In these respects, these three forms of the invention are similar to the forms described above. Also, the hooks at the ends of the reinforcing bar for engaging the fender flanges ahead of and behind the wheel access openings in the fenders, the rubber edging, and the means for holding the edging in place are the same. Each of the three forms is provided with a stay 141, 142, or 143 whose upper end is provided with a shoe or plate for engaging the upper edge of the fender shield panel 136 and which carries a latch similar to the construction shown in Figures 6 to 10, although any suitable form of latch may be provided.

The essential difference between the three forms of the invention shown in Figures 14 to 19 and the first three forms described lies in the manner in which the stays 141, 142 and 143 are pressed upwardly with respect to the reinforcing bar 138 at the bottom of the fender shield panel 136. In the form of the invention shown in Figures 14 and 15, the stay 141 is provided with two rectangular bends 144 and 145 near its lower end which provides a horizontal portion 151 between them immediately above the top of the reinforcing bar 138. Beyond the two bends 144 and 145, the stay 141 extends down alongside of the reinforcing bar 138, and is formed into a tongue 146 which fits slidably in an aperture in a guide plate 147 riveted to the top of and projecting behind the reinforcing bar 138. Thus the lower end of the stay 141 is free to move vertically with respect to the reinforcing bar 138 and the flange 137 on the bottom of the fender shield panel 136 but is restrained against lateral movement by the guide plate 147.

Figure 14:
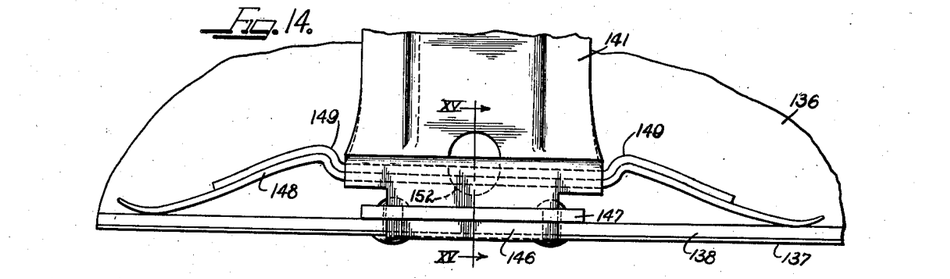
Figure 14 is a view of a part of the back of a fender shield embodying a fourth form of the invention.
Figure 15:
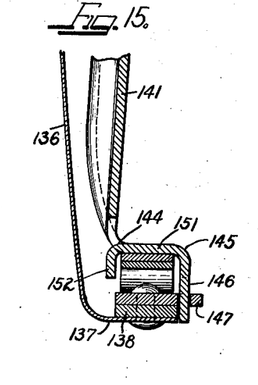
Figure 15 is a cross-sectional view taken on the line XV—XV of Figure 14 and looking in the direction of the arrows.

The bottom of the stay 141 is forced up with respect to the reinforcing bar 138 by means of a curved leaf spring 148 whose central portion fits under the horizontal part 151 near the bottom of the stay 141 and whose ends bear down on top of the reinforcing bar 138. The spring 148 is prevented from sliding longitudinally by being formed with humps 149 which rise up at each side of the horizontal portion 146 of the stay against which the spring bears, and the spring 148 is prevented from twisting sideways by a lug 152 depending on the opposite side of the horizontal spring seat 151 from the downwardly extending portion or tongue 146 of the stay.

It will be readily seen that the spring 148 exerts an upward force on the stay 141 which will force the upper and lower edges of the fender shield panel apart, tending to flatten the fender shield from top to bottom and to increase its curvature from side to side as compared to its normal curvature without the application of any external force. The range of variation in fenders to which the fender shield will accommodate itself makes it possible for the same fender shield to fit more different fenders without adjustment than would otherwise be possible.

Figure 16:
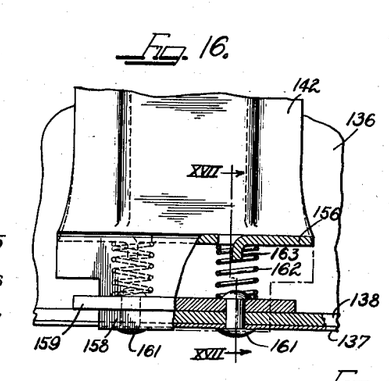
Figure 16 is a view, partly broken away and in section, of a part of a fender shield embodying a fifth form of the invention.

In the form of the invention shown in Figure 16, the stay or strut 142 is formed with two rectangular bends 155 and 156 near its lower end so as to provide a horizontal spring seat 157 directly above the reinforcing bar 138. The end of the stay 142 below the spring seat 157 forms a tongue 158 which extends down behind the reinforcing bar 138 after passing slidably through an aperture in a guide plate 159 secured on top of the reinforcing bar 38 by a pair of rivets 161.

Two helical springs 162 under compression are located between the guide plate 159 on top of the reinforcing bar and the underside of the spring seat 157 and act to force the stay upwardly with respect to the reinforcing bar 138. The lower ends of the springs 162 fit around the heads of the rivets 161, which thus keep them in position, and their upper ends fit around lugs 163 struck out of the spring seat 157.

Figure 17:
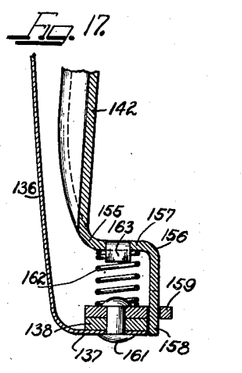
Figure 17 is a cross section taken on the line XVII—XVII of Figure 16 and looking in the direction of the arrows.

It will be seen that the form of the invention illustrated in Figures 16 and 17 and described above is essentially the same as that illustrated in Figures 14 and 15, differing therefrom chiefly in that it is made with a different form of spring, and that it will operate in essentially the same manner.

Figure 18:
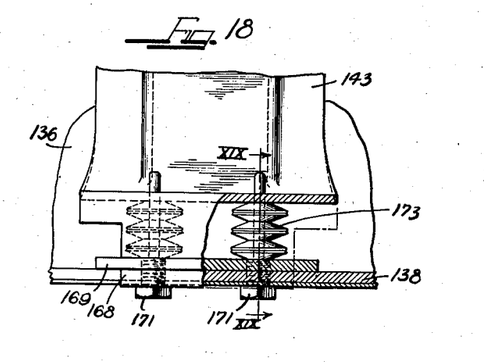
Figure 18 is a view, partly broken away and in section, of a part of the back of a sixth form of the invention.
Figure 19:
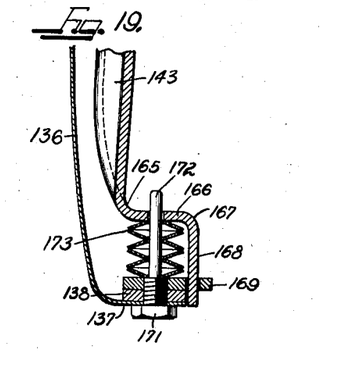
Figure 19 is a cross section taken on the line XIX—XIX of Figure 18 and looking in the direction of the arrows.

In the form of the invention illustrated in Figures 18 and 19, the stay 143 is formed with a pair of rectangular bends 165 and 167 near its lower end which provides between them a horizontal spring seat 166 located directly above and facing the horizontal reinforcing bar 138. The end of the stay 143 below the spring seat 166 is formed into a tongue 168 which passes through an opening in a guide plate 169 and projects down in back of the reinforcing bar 138. The guide plate 169 is secured on top of the reinforcing bar 138 by a pair of screws 171 extending through the flange 137 on the bottom of the panel and the reinforcing bar 138 and being threaded into the guide plate 169. A pair of guide pins 172 are formed integrally with the screws 171 and extend upwardly through holes in the spring seat 166.

Each of the guide pins 172 carries a stack of Belleville washers 173 and forms a guide for the washers 173 which press down upon the guide plate 169 and up against the spring seat 166. Thus the stacks of Belleville washers 173 tend to force the stay 143 upwardly with respect to the reinforcing bar 138. From this it can be seen that this form of the invention functions in exactly the same way as the forms of the invention illustrated in Figures 14 to 17 and differs therefrom only in the type of spring used and in the manner of attaching the springs.

While I have shown and described six specific forms of my invention, it will of course be understood that these forms may be varied and that some of the features of one form may be used with some of the features of another, as by using the latch mechanism of one form in connection with the pressure applying means of another form, and that many other modifications may be made. I therefore contemplate by the appended claims to cover not only the particular structures shown and described but also all such modifications as fall within the true spirit and scope of my invention.

I claim as my invention:

1. A fender shield comprising a sheet metal panel curved vertically and longitudinally, and means extending between and adapted to contact opposite edges of said panel, said means being adjustable to vary the distance between said opposite edges.

2. A fender shield comprising a sheet metal panel curved vertically and longitudinally, a strut secured at one end to one edge of said panel and extending toward the opposite edge thereof, and spring means cooperating with the other end of said strut and said opposite edge of said panel for forcing said opposite edge away from said first edge.

3. In a fender shield comprising a curved panel adapted to cover the wheel access opening in a fender, an upright stay on the back of the panel, means for preventing movement of the upper end of said stay relative to the upper edge of said panel, guide means for preventing transverse movement of the lower end of said stay relative to the lower edge of said panel, and means for forcing the lower end of said stay upwardly with respect to the lower edge of said panel.

4. In a fender shield comprising a curved panel adapted to cover the wheel access opening in a fender, an upright stay on the back of the panel, means for preventing movement of the upper end of said stay relative to the upper edge of said panel, guide means for preventing transverse movement of the lower end of said stay relative to the lower edge of said panel, and manually adjustable means for forcing the lower end of said stay upwardly with respect to the lower edge of said panel, said means being readily accessible and operable from the front of said fender shield by reaching in under the lower edge of said panel.

5. In a fender shield comprising a panel adapted to cover the wheel access opening in a fender and having its upper edge folded over and down, an upright stay on the back of said panel, means for securing the lower end of said stay to the bottom of said panel, a member fitting up between the body of said panel and said folded over edge, and means for forcing said member up into tight engagement with said panel and for guiding said member with respect to said stay.

6. In a fender shield comprising a panel adapted to cover the wheel access opening in a fender and having its upper margin folded over and down, an upright stay on the back of said panel, means for securing the lower end of said stay to said panel, a shoe fitting up between the body of said panel and said folded over margin, means for slidably connecting said shoe to said stay whereby said shoe may move vertically and rotate about a vertical axis with respect to said stay, and means for forcing said shoe upward with respect to said stay.

7. In a fender shield comprising a panel adapted to cover the wheel access opening in a fender, an upright stay having the lower end thereof secured to the lower edge of said panel and having a vertical tube formed at its upper end, a member secured to said panel near the upper end of said stay, and a pivot fixed to said member and rotatably mounted in said tube.

8. In a fender shield comprising a panel adapted to cover the wheel access opening in a fender and having the upper edge thereof folded back and down to form a downwardly facing trough, an upright stay on the back of said panel, means for fixing the lower end of said stay to said panel, means forming a vertical tube at the upper end of said stay, a member fitting up into said trough and having a threaded stud fitting rotatably down into said tube, and a nut threaded on said stud and bearing against the upper end of said tube for holding said member pressed tightly into said trough.

9. In a fender shield comprising a panel adapted to cover the wheel access opening in a fender, a torsionally flexible stay on the back of said panel, said stay having one end fixed to the bottom of said panel and the other end secured to the upper portion of said panel but rotatable with respect thereto about an upright axis, and a dog-legged lever pivoted to the upper portion of said stay, the upper end of said lever being adapted to extend up behind and engage said fender for holding said fender shield against the face of said fender and the lower end of said lever being adapted to engage means on the lower portion of said fender shield, said means and the lower portion of said lever being adapted to prevent movement of said lever when engaged and said means being spaced from said stay whereby the torsional resiliency of said stay will facilitate the springing out of the lower end of said handle from said means and permit said lever to be rotated to a position in which the upper end thereof is disengaged from said fender.

10. In a fender shield comprising a panel adapted to cover the wheel access opening in a fender and having a flange along the lower edge thereof, means for securing said panel to said fender including a handle on the back of said panel, a pivot for said handle on said panel, the end of said handle being shaped to fit over and in back of and under said flange, and means for resiliently holding said end of said handle in engagement with said flange.

11. In a fender shield comprising a panel adapted to close the wheel access opening in a fender and having a flange along its lower edge, means for holding said panel in place including an operating handle movable in a path at an angle to said flange, said handle having a portion adapted to embrace said flange, and means for resiliently urging said portion into engagement with said flange, and a piece of relatively soft sound absorbing material interposed between said handle and said flange.

12. A fender shield comprising a curved panel adapted to cover the wheel access opening in a fender, and having an inturned upper edge and a horizontal bottom flange, a horizontal reinforcing bar secured on top of said flange, an upright stay on the back of said panel and having means at the top thereof for fitting in under and bearing up against the inturned upper edge of said panel, guide means secured to said reinforcing bar and engaging the lower end of said stay for preventing transverse movement thereof while permitting vertical movement thereof, and adjustable means carried by said stay for forcing the lower end thereof upwardly with respect to said reinforcing bar.

13. A fender shield comprising a curved panel adapted to cover the wheel access opening in a fender, an upright stay on the back of said panel, means for preventing movement of the upper end of said stay upwardly with respect to the upper edge of said panel, a horizontal flange on the lower edge of said panel, guide means for preventing transverse movement of the lower end of said stay relative to said horizontal flange, and a vertical adjusting screw having a downwardly facing shoulder for transmitting pressure to said horizontal flange and an operating stem extending through a hole in said flange, said screw having a threaded portion operatively connected to the lower end of said stay for forcing said stay upwardly with respect to said horizontal flange.

14. A fender shield comprising a sheet metal panel curved vertically and longitudinally and having an upwardly facing shoulder on the back at the bottom, an upright strut on the back of said panel and having the upper end thereof connected to the upper edge of said panel, said strut having a downwardly facing spring seat adjacent the lower end thereof and opposed to said shoulder, and a leaf spring bearing on said shoulder and said spring seat and urging said strut upwardly with respect to the bottom of said panel.

GEORGE W. SCHATZMAN.